June 19, 1951     H. L. BEEKLEY     2,557,718

VALVE

Filed Sept. 10, 1947

Inventor:
Henry L. Beekley,

Patented June 19, 1951

2,557,718

UNITED STATES PATENT OFFICE 2,557,718

VALVE

Henry L. Beekley, Glen Ellyn, Ill., assignor, by mesne assignments, to Electrimatic Company, a corporation of Illinois Application September 10, 1947, Serial No. 773,251

8 Claims. (Cl. 137—153)

This invention relates to a valve, and more particularly to a valve adapted to regulate the amount of flow of fluid therethrough.

Valves of the type referred to here comprise a valve body having an inlet, and outlet and a partition separating said inlet and outlet, said partition having a flow opening therethrough. A valve member adapted to control the flow of fluid through said opening is contained within said body, this valve member usually comprising a piston slidable in an operating chamber within the body and generally on the inlet side of the partition; and an actuating arrangement is provided for operating the valve member to regulate the flow of fluid through the opening. In the past, the opening through which the valve piston enters the operating chamber usually was sealed by means of a leather washer which generally had an upturned annular flange surrounding said piston. Such an arrangement has proved unsatisfactory in several respects, and my present invention comprises an improvement over the previously used arrangement of valve parts.

A leather washer such as has been generally used in the past does not provide a perfect fluid tight seal. For example in a water regulating valve designed to control the flow of cooling water to the condensers of refrigerating machines such a washer leaks on the average of from a quart to a half gallon a day. Since in operation such valves are very seldom completely closed, but usually remain in an intermediate open position, the actual volume of the leakage is not especially objectionable. However, since the chamber sealed by the leather washer is most often for other reasons located on the inlet or high pressure side of the partition above mentioned, leakage through the leather washer allows a pressure equal to the high pressure of the inlet to build up in the operating chamber under the piston, while the other side of the piston is subjected only to the low pressure of the outlet. Since the inlet pressure may be in the neighborhood of 100 or even 150 pounds per square inch while the outlet pressure is much lower, a much greater actuating force is required to operate the valve than would be required if high inlet pressures within the operating chamber could be avoided. One important feature of this invention is that it provides a leakproof sealing device to replace the leather washer heretofore used, thus isolating the interior of the operating chamber from the high inlet pressure.

In a pressure actuated valve of the type illustrated in the drawings in this application, the size of the flow opening in the partition between the inlet and the outlet has in the past been undesirably limited because of the limits on the actuating pressures available. For example, in a ¾ inch pressure actuated valve, a flow opening of approximately $\frac{11}{16}$ inches was about the maximum which could be used, and often if the actuating pressures were low, trouble was encountered in opening or unsealing the valve. In the same type of valve constructed in accordance with my invention, it is possible to use a flow opening of at least $\frac{15}{16}$ inch diameter, and with such an opening, my improved valve gives a better flow with no opening difficulties at the same actuating pressures and with the same valve springs.

I obtain this improved operation by balancing the pressures operable upon the sliding valve piston at the low pressure of the valve outlet.

In a valve of the type referred to here, the bead which defines the flow opening is preferably of the same diameter as the valve piston which cooperates with said bead to control the flow of fluid through the opening. By constructing a valve capable of using a larger diameter bead than has heretofore been possible, I am able to obtain the same effective flow opening with less linear movement of the piston, and consequently with less linear movement of the actuating arrangement for the piston. This actuating arrangement usually comprises a rod actuated by pressures, as the head pressure in a refrigerating system or the fluid pressure in a thermostat bulb. Since, in a valve constructed in accordance with my invention, less movement is required of the actuating rod to obtain an equivalent fluid opening, less flexing of the actuating bellows is required, with consequent improvement in life of such bellows; and, particularly where actuation is from a thermostat bulb, better regulation is obtained.

As a further feature of my invention, I provide a valve not subject to the "water hammer" action of similar valves in the past. In a valve constructed prior to my invention, the accelerated flow of the fluid being regulated as the valve starts to close, causes a suction which pulls the valve closed rapidly and results in a "water hammer." In a valve constructed in accordance with my invention wherein I provide an open bleeder communicating with the operating chamber and the outlet, any suction-caused drop in the pressure exists below the valve piston as well as above said piston. Consequently, the valve closes more slowly and no "water hammer" effect results.

Other features and advantages of my invention will be apparent from the following specification and from the drawings in which.

Figure 1:
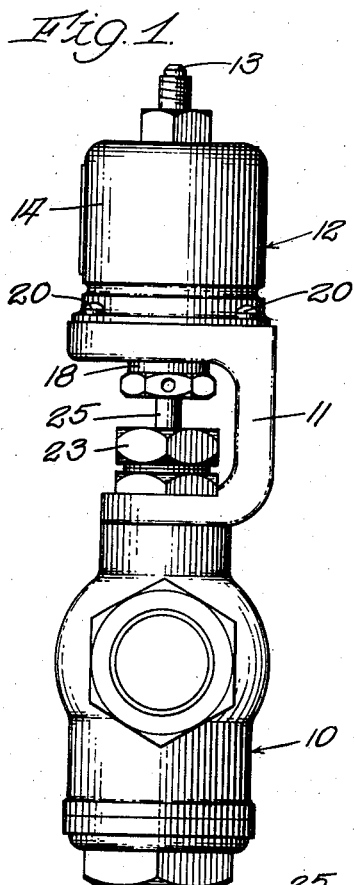
Fig. 1 is an elevation of a pressure actuated valve constructed in accordance with my invention.
Figure 2:
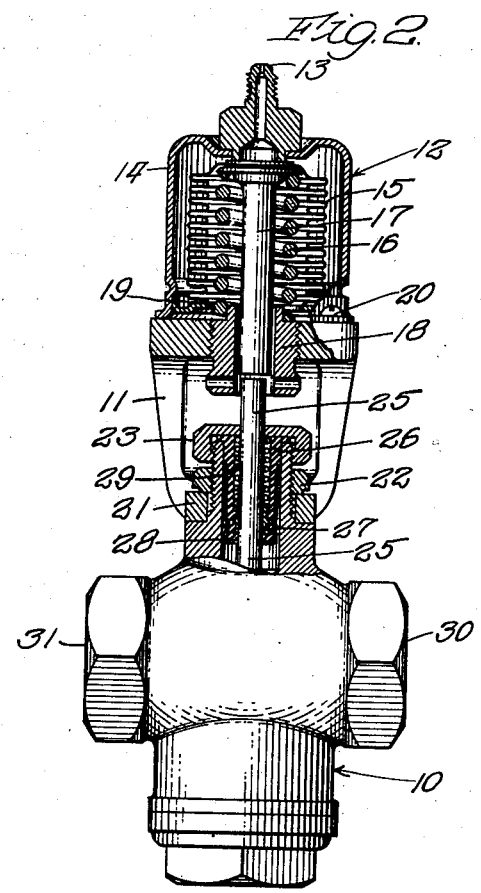
Fig. 2 is an elevation partly in section of the valve of Fig. 1 taken at right angles to Fig. 1.

Referring now to the drawings, my invention is illustrated in a pressure actuated valve, though obviously other types of valves, as for example electrically actuated valves, may be equally adapted to the invention. The valve illustrated comprises a body portion designated generally at 10, said body being secured to a yoke 11 upon which is mounted the actuating portion designated generally at 12 of a control device. The actuating apparatus illustrated is a conventional arrangement which may be operated by fluid pressure, as for example head pressure in a refrigerating system or fluid from a control thermostat.

Control fluid for actuation is admitted through a pipe and a flare connecting member 13 to a housing 14 where the pressure of the control fluid is exerted on a yieldable member here illustrated as a Sylphon type bellows 15 in opposition to a spring 16 so that the position of the bellows 15 and of a push rod 17 secured to the top of said bellows (as the parts are illustrated) vary as a function of the pressure of the control fluid.

A sealing arrangement is also provided in conventional manner to isolate the control fluid from the valve body, a coupling member 18 being screw threaded to the head or top of the yoke 11, and the push rod 17 slidably entering said coupling member. The bottom end of the bellows 15 is fixed in sealing engagement with the housing 14 by being crimped or otherwise secured to the inner annular edge of a bottom sealing member 19 within said housing, and the housing 14 is secured to the top of the yoke by means of screws 20. As will be readily understood, this construction seals the control fluid outside of the bellows 15 so that the bellows 15 is caused to expand or contract under fluctuations in pressure of the control fluid and through the action of the spring 16 so that the push rod 17 which is carried by the bellows has a longitudinal or vertical movement.

The arms of the yoke 11 are affixed at their lower ends to an annular ring 21 mounted upon a shoulder on the valve body 10, and this ring is clamped against said shoulder by a lock nut 22 threaded onto the upwardly extending portion of the valve body. A sealing nut 23 is threadably mounted on the extreme upper body portion and aids in sealing the upper end of the body portion as will hereafter be described.

Another push rod 25 extends out of the body portion through a central opening in the sealing nut 23, this push rod slidably entering the opening in the coupling member 18 and terminating adjacent the bottom of the push rod 17.

While the push rod 25 may be sealed by means of a Sylphon type bellows or by other means, in the valve illustrated such push rod is sealed by means of a resilient boot 26, said boot having an outwardly turned annular flange at its upper end which is clamped between the sealing nut 23 and the top of the valve body. The lower end of the boot is clamped between a grooved boot adapter 27 which is soldered or otherwise secured to the push rod 25, and a boot cup or ferrule 28 which is slid over the push rod and boot and affixed in clamping relationship with said boot by spinning or pressing. With this construction the boot is firmly and nonleakably affixed to the push rod 25, and a spring 29 preferably is positioned between the boot and the push rod to support the resilient walls of the boot. Preferably the spring is easily slidable over the push rod 25 so that any elongation or contraction of the boot incident to longitudinal movement of the push rod 25 is accompanied by an equal and equally distributed movement of the turns of the spring, so that each spring turn remains in engagement with the same portion of the inner surface of the boot wall.

Figure 3:
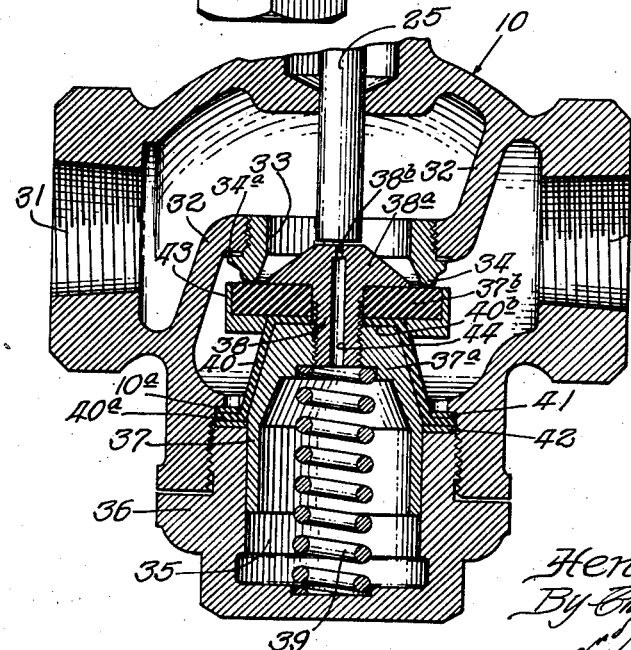
Fig. 3 is an enlarged vertical section through the valve body portion of the apparatus shown in Fig. 2.

The valve body 10 has a threaded inlet opening 30 and a threaded outlet opening 31. The inlet and outlet are separated by a partition 32 having a flow opening 33 therethrough. This flow opening is defined by an annular bead 34 which acts as a valve seat, said bead being threaded into the opening 33 in the partition and being provided with a gasket 34a in order to provide a seal. As illustrated in Fig. 3, the flow opening may be and preferably is of substantial diameter. Located on the inlet side of the partition 32 is an operating chamber 35, the bottom of which is sealed by a cap nut 36 threaded on the main body member 10.

A valve member adapted to cooperate with the valve seat to control the flow of fluid through the opening 33 comprises a hollow valve piston 37 which is slidable in the chamber 35, said piston extending beyond said chamber and having a portion 37a spaced from the walls of the valve body 10, this part having a generally truncated conical shape. At its top the piston carries an annular packing member 37b which is adapted to engage the bead 34, this packing being mounted on the piston by means of a mounting member 38 which is threaded into the top of the piston. The member 38 terminates adjacent the lower end of the push rod 25 so that the valve member may be operated in one direction by said push rod, and said mounting member has an enlarged head portion 38a having a screw head type slot 38b in its upper surface. A spring 39 within the chamber 35 abuts the sealing nut 36 at its lower end and the piston 37 at its upper end and operates the valve member in the other direction.

As pointed out earlier in this specification, if the chamber 35 is sealed at the point where the piston 37 enters said chamber by means of a leather washer as has been conventionally done in the past, some leakage occurs and the high inlet pressures exist below the piston within said chamber. Consequently, much greater pressures are required to operate the valve. I have replaced the conventional leather washer with an improved sealing means comprising a resilient boot 40 of rubber or other suitable material. This boot has an internal diameter only slightly greater than the external diameter of the piston 37, and surrounds the upper portion of said piston, having a generally truncated conical shape corresponding to that of said upper portion. This shape is particularly advantageous in preventing binding of the sealing boot against the piston, due to inlet side pressure, during movement of the piston. At one end (the bottom as illustrated) the boot has an outwardly turned annular flange 40a which is clamped between the sealing nut 36 and an annular shoulder 10a on the body 10. I preferably employ sealing washers 41 and 42 on either side of the annular flange 40a of the boot.

The upper portion of the boot has an inwardly turned annular flange 40b which is sealed to the valve member, this flange being clamped between the packing 37b and the upper surface of the piston 37, an annular member 43 cooperating with a shoulder adjacent the upper part of the piston and serving the dual purpose of preventing the packing from spreading and clamping the boot 40. As shown, the intermediate portion of the boot is spaced from the inner walls of the body member 10 and is adapted to flex in said space as the piston moves during the operation of the valve.

Having provided an absolutely leakproof seal which isolates the chamber 35 from the high inlet pressures, I further improve the valve by providing a vent opening from the chamber 35. As illustrated, this vent comprises a passageway 44 through the mounting member 38, this passageway being in communication with the chamber 35 and the outlet or low pressure side of the partition 32. Since the head 38a of the mounting member 38 is engaged by the push rod 25 when the valve is operated in one direction, in order to prevent the push rod 25 from blocking the vent opening, I direct the terminal portion of said vent which communicates with the outlet at substantially a right angle to the direction of operation of the pressure actuated push rod. As illustrated in Fig. 3, the vent opening communicates at its upper end with the bottom of the slot 38b in the head of the mounting member 38, thereby obviating the possibility of the vent opening being blocked by the mounting member.

With this improved construction, I am able to construct a valve wherein, in a ¾ inch valve, the bead 34 has as much as $\frac{15}{16}$ inch diameter. This represents a flow opening approximately 35% larger than has heretofore been deemed feasible in such a valve. Since the pressure of the control fluid in my improved valve must only be sufficient to overcome the resistance of the spring 39, and need not also overcome the pressure differential between the high pressure inlet and the low pressure outlet, a valve constructed in accordance with my invention and having a flow opening of such substantial diameter operates with no opening troubles since the pressures on both sides of the piston 37 are now balanced at the low pressure of the outlet, whereas before my invention the actuating fluid must not only overcome the spring 39, but must overcome the pressure differential between the inlet and the outlet. Furthermore, by using a larger diameter bead a given quantity of flow through the valve can be obtained without opening the valve to the extent heretofore necessary. This means that less movement of the actuating rod 25 is required, and consequently the contraction of the Sylphon bellows 15 is less than in prior valves, causing less control fluid to flow from the control thermostat into the housing 14. Better regulation is thus achieved, since as my improved valve operates there is less drop in actuating pressure. As a further advantage of my improved valve, the equal pressure on both sides of the valve piston causes the valve to close more slowly, thus eliminating the possibility of the valve acting as a "water hammer."

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A pressure actuated valve of the character described, including: a valve body having an inlet, an outlet and an operating chamber; a partition separating said inlet and outlet, said partition having a flow opening of substantial diameter therethrough and said chamber being on the inlet side of said partition; a valve piston slidable in said chamber; sealing apparatus between said inlet and chamber; an annular replaceable packing member for closing said opening; and a member carrying said annular packing for mounting said packing on said piston, said mounting member having a head with a slot therein, said head lying in a plane substantially transverse to the direction of flow through the flow opening adjacent said opening and said piston and mounting member having a central vent opening therethrough in communication with said chamber and said slot, the slot providing communication between said vent and outlet at substantially a right angle to the direction of flow through said flow opening.

2. A pressure actuated valve of the character described, including: a valve body having an inlet, an outlet and an operating chamber; a partition separating said inlet and outlet, said partition having a flow opening therethrough, and said chamber being on the inlet side of said partition; a valve member adapted to control the flow of fluid through said opening, said member comprising a piston slidable in said chamber, said piston having a portion with tapered walls extending out of said chamber, and there being a vent opening in communication with said chamber and said outlet; and a hollow resilient boot coaxially mounted on said piston said boot having tapered walls fitting the tapered walls of said piston and said boot having a flanged end in sealing engagement with said valve member and an opposite flanged end in sealing engagement with said body.

3. A pressure actuated valve of the character described, including: a valve body having an inlet, an outlet and an operating chamber; a partition separating said inlet and outlet, said partition having a flow opening of substantial diameter therethrough; a valve piston slidable in said chamber, said piston extending beyond said chamber and having a portion spaced from the walls of said body; packing for closing said opening; a member mounting said packing on said piston, said mounting member having a head with a slot therein and said piston and mounting member having a vent opening therethrough in communication with said chamber and said slot; a resilient member engaging said body and said piston for operating said valve in one direction; and a hollow resilient boot coaxially mounted on a portion of said piston which is spaced from the walls of said body, said boot having an inwardly flanged end in sealing engagement with said valve member, an opposite outwardly flanged end in sealing engagement with said body, and an intermediate portion of substantially the same size as that portion of said piston on which it is mounted and adapted to flex in the space between said piston and the walls of said body.

4. A valve of the character described, including: a valve body having an inlet, an outlet and an operating chamber therein; a partition separating said inlet and outlet, said partition having a flow opening therethrough; a valve member adapted to control the flow of fluid through said opening, said member comprising a piston slidable in said chamber; and a hollow resilient boot mounted on said piston in sealing engagement with said valve member and said body, interfitting portions of said piston and boot being similarly generally conical in shape and said boot having an internal diameter only slightly greater than the external diameter of the portion of said piston on which the boot is mounted.

5. A valve of the character described, including: a valve body having an inlet, an outlet and an operating chamber therein; a partition separating said inlet and outlet, said partition having a flow opening therethrough; a valve member adapted to control the flow of fluid through said opening, said member comprising a piston slidable in said chamber, said piston having a tapered portion; and a hollow resilient boot coaxially mounted on said tapered portion of the piston, said boot having a tapered bore closely fitting the tapered portion of the piston on which it is mounted, and having a flanged end in sealing engagement with said valve member and an opposite flanged end in sealing engagement with said body.

6. A valve of the character described, including: a valve body having an inlet, an outlet and an operating chamber therein, a partition separating said inlet and outlet, said partition having a flow opening therethrough; a valve member adapted to control the flow of fluid through said opening, said member comprising a piston slidable in said chamber, said piston having a truncated conical portion extending beyond said chamber and spaced from the walls of said body; a resilient member engaging said body and said piston for operating said valve member in one direction; and a hollow resilient boot coaxially mounted on said truncated portion of said piston, the walls of said boot being tapered to conform with the shape of the piston and lying closely adjacent the walls of the piston throughout the entire length of the boot, said boot having an inwardly flanged end in sealing engagement with said valve member, an opposite outwardly flanged end in sealing engagement with said body, and an intermediate portion adapted to flex in the space between said piston and the walls of said body.

7. A pressure actuated valve of the character described, including: a valve body having an inlet, an outlet and an operating chamber; a partition separating said inlet and outlet, said partition having a flow opening of substantial diameter therethrough; a valve piston slidable in said chamber; an annular packing member for closing said opening; and a member carrying said annular packing for mounting said packing on said piston, said mounting member having a head with a top face having a slot therein, said top face of the head lying in a plane substantially transverse to the direction of flow through the flow opening and said piston and mounting member having a central vent opening therethrough in communication with said chamber and said slot.

8. A valve of the character described, including: a valve body having an inlet, an outlet and an operating chamber; a partition separating said inlet and outlet, said partition having a flow opening therethrough, and said chamber being on the inlet side of said partition; a valve member adapted to control the flow through said opening, said member comprising a piston slidable in said chamber, said piston having a portion with tapered walls, and there being a vent opening in communication with said chamber and said outlet; and a hollow resilient boot in sealing engagement with said valve member, said boot having a portion with tapered walls mounted on the tapered portion of said piston.

HENRY L. BEEKLEY.

REFERENCES CITED

The following references are of record in the file of this patent:

UNITED STATES PATENTS

| Number | Name | Date |
|---|---|---|
| 951,172 | Biedenmeister | Mar. 8, 1910 |
| 1,401,879 | Comings | Dec. 27, 1921 |
| 1,589,288 | Hansen | June 15, 1926 |
| 1,996,351 | Schultz | Apr. 2, 1935 |
| 2,013,869 | McElwaine | Sept. 10, 1935 |
| 2,158,715 | Beekley | May 16, 1939 |
| 2,249,258 | Shaw | July 15, 1941 |
| 2,264,656 | Briscoe | Dec. 2, 1941 |
| 2,265,496 | Shaw | Dec. 9, 1941 |
| 2,331,503 | Ray | Oct. 12, 1943 |
| 2,426,065 | Stevens | Aug. 19, 1947 |